(No Model.)

P. C. HEWITT.
SPRING TIRE.

No. 576,365.  Patented Feb. 2, 1897.

Witnesses
Edward Thorpe

Inventor
Peter Cooper Hewitt
By his Attorney

UNITED STATES PATENT OFFICE.

PETER COOPER HEWITT, OF NEW YORK, N. Y.

SPRING-TIRE.

SPECIFICATION forming part of Letters Patent No. 576,365, dated February 2, 1897.

Application filed October 20, 1893. Serial No. 488,691. (No model.)

*To all whom it may concern:*

Be it known that I, PETER COOPER HEWITT, of the city, county, and State of New York, have invented a certain new and useful Improvement in Spring-Tires, of which the following is a description, referring to the accompanying drawings, which form a part of this specification.

The object of my invention is to produce a tire having all the advantages of the pneumatic or inflated tire without some of the disadvantages attending the use of inflated tubes or bags.

According to my invention a helix or spiral of high-grade spring metal is secured to the face of the felly or rim of the wheel. Preferably, also, this helix is provided with circumferential strands interwoven with it and parallel with the rim or felly and presenting a more durable wearing face or tread. These circumferential strands are preferably pressed closely together laterally, so that they form a virtually continuous face, preventing the throwing of mud and giving a smooth action to the tread of the wheel. When the helical spring is secured around the circumference of the rim or felly, the convolutions of the spring preferably touch each other at the face of the felly. This leaves a slight space between the convolutions at the tread of the tire, giving the necessary space for the circumferential interwoven strands or bands. To give greater strength to the tire, I may place a rubber inflation-tube within the metallic spring-shell so formed and employ very much larger air-pressure than is possible without the use of metal in the sheath. The tire may be held in place upon the felly or rim in several ways. Preferably, however, I employ a tire wire or band passing around the felly inside the tire and drawing it firmly against the face of the felly. For this purpose the face of the felly may contain a channel or groove, and the convolutions of the tire may be drawn or bent into the channel by the retaining-band or tie-wire. The face of the felly is preferably convex at each side, so that when the tire is pressed against the ground the felly may form a support for the upper portion of the convolutions. The curve of the face of the felly is therefore made sufficiently slight to prevent the bending of the tire convolutions beyond their limit of elasticity.

Such, briefly, is a general sketch of my invention, which will be better understood from one embodiment of it, as illustrated in the accompanying drawings, wherein—

Figure 1:
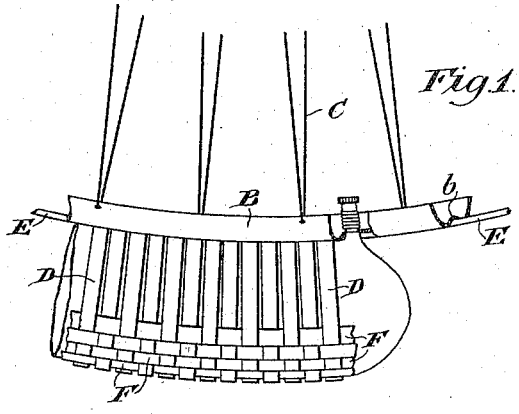
Figure 2:
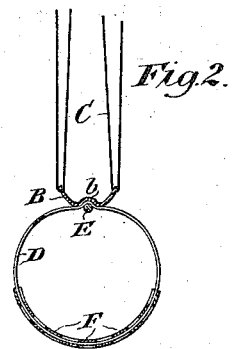
Figure 3:
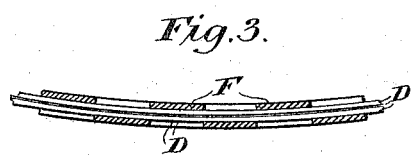
Figure 4:
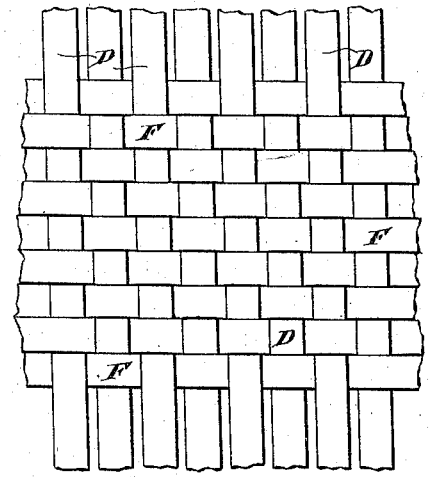

Figure 1 is a side view of a portion of my tire as mounted upon its rim or felly. Fig. 2 is a cross-section showing the construction of the parts and in dotted lines showing the action of the tire when compressed. Fig. 3 is an enlarged section of a modification, and Fig. 4 shows a portion of the face of the tread.

Throughout the drawings like letters of reference indicate like parts.

The felly is indicated by B, the spokes by C, and the convolutions of the helical-spring tire by D. It will be seen that these lie closely together against the face of the felly, but diverge slightly at the opposite face of the tire, allowing the circumferential bands F to be interwoven through them, as clearly seen in all the figures.

The helix D is preferably formed of thin flat spring-steel of high grade. In Fig. 2 the method of retaining the convolutions in place against the felly is clearly shown. The felly is provided with a recess or channel $b$, within which a retaining or tie wire or band E confines the convolutions D. The tread-bands F are preferably formed of similar material to the spring D and are pressed closely together, as in Fig. 4, to allow no space for the introduction of mud.

I do not find it necessary to cover the tire with a rubber or other protecting surface, though of course I may do so without departing from the principles of construction already described. The convolutions D, touching each other at the face of the felly and diverging toward the tread, in themselves form the means for preventing the circumferential bands F from working up toward the felly and keep them pressed firmly together, as in Fig. 4. I find it advisable in practice to make the diameters of these convolutions about two and one-half inches, and I am enabled to somewhat reduce the diameter of the wheel itself.

Where greater strength is required than is readily obtained from a single layer of spring D, I provide two or even three helices, as shown in Fig. 3, giving greater strength without decreasing the flexibility of the tire. In Fig. 2 an inner inflating-tube G is shown. This may be formed of very thin rubber, because it is thoroughly protected by the surrounding tire and because the surrounding tire affords great strength as a confining-sheath within which the tube may be subjected to enormous pneumatic pressure. On account of the enormous pressure which may be employed I have devised a method and a tight-closing valve for hermetically closing the mouth of the inflating-tube. I have found that, owing to the film of air which is almost always present in all valves with which I am familiar when used with enormous pressure, the film seems to be constantly forced out by the pressure and replaced by the air from the inside of the tube, so that it is impossible with such valves as usually employed to keep a tire inflated to its full pressure. I have devised a very simple method, however, of getting rid of this air-film and giving an absolutely tight and permanent closure of the valve. This method consists of coating the valve, which is preferably in the form of a plug fitting into a tube, with wax. When the tire has been inflated and the plug inserted, the end of the plug is heated by means of a match, and the heat transmitted to the wax hermetically seals the joint. This method may be applied to almost any form of valve, whether used between meeting metallic surfaces or rubber surfaces. I find that a slightly conical or tapered plug covered with wax and forced into a corresponding metallic socket forms in itself a perfectly tight and reliable valve. While I prefer to employ wax, it is clear that several other plastic substances may be substituted, and in claiming wax I desire to secure to myself all such substances as act for the same purposes in substantially the same manner.

Figure 5:
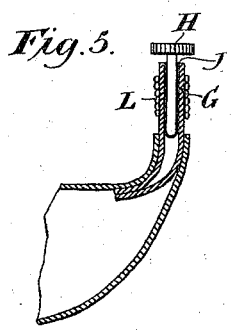

In Fig. 5 I show in cross-section one form of my valve which is simple, cheap, and very effective. The inflating-tube is provided with a rubber tube or mouth G, by which it may be blown up. Within this, which I cut off from time to time as it becomes injured or worn at the end, I place a metallic pin or plug H, covered with a coat of wax J. I then wind the tube G with a tight bandage of rubber L, forcing it with great pressure against the wax coating J upon the pin H. This in itself may produce a sufficiently tight and satisfactory sealing of the valve, but preferably I heat the end of the pin J and thereby render the wax more plastic, causing it to wet or adhere to both the pin and the tube G and driving out the film of air.

I have now set forth one form of my invention and the way in which it may be constructed and used. I have purposely omitted many modifications and variations which may be made by "skill in the art" without departing from the principles of my invention, because to enumerate them would obscure rather than make clear the more essential features.

I therefore claim and desire to secure to myself, with only the limitations and restrictions expressed or necessarily implied, the following:

1. A spring-tire consisting of a helix D secured to the felly or rim B, and circumferential bands of strands F interwoven therewith, substantially as and for the purposes set forth.

2. A spring-tire consisting of a helix D secured to the felly or rim B, and circumferential bands or strands F interwoven therewith, and an inflation-tube confined within the said helix, substantially as and for the purposes set forth.

3. In combination with a felly or rim provided with a central circumferential channel or recess b therein, a tire mounted upon the said felly or rim and a tie wire or band E extending through the said tire and fitted to the said recess, the said wire or band E confining a portion of the said tire within the said recess by tensile or circumferential force only and thereby holding the said tire to the said felly or rim, substantially as set forth.

4. In combination, a felly or rim having its face convex in cross-section, a circumferential channel or recess therein, a hollow tire, and a tension-wire confining the said tire against the said convex face along the said channel or recess, substantially as set forth.

5. In combination a hollow tire of rounded cross-section, a convex felly or rim, and a tie-wire or other fastening device securing the said tire to the said felly or rim in substantially a single line of contact, substantially as set forth.

6. In combination, a convex felly or rim and a pneumatic or spring tire secured thereto in substantially a single line of contact.

7. In combination, a helix or convolutions D, an inflated tube therein under great pneumatic or other expanding pressure, a felly or rim therefor to which the said helix or convolutions is or are secured, and one or more circumferentially-extending tension supporting devices resisting the longitudinal or circumferential expansive force, substantially as set forth.

8. In combination in a spring-tire, convolutions D and circumferential bands or strands F interwoven therewith, substantially as and for the purposes set forth.

In testimony whereof I hereunto set my hand this 16th day of October, 1893.

PETER COOPER HEWITT.

Witnesses:
HAROLD BINNEY,
GEO. H. SONNEBORN.